United States Patent
Brimijoin, II et al.

(10) Patent No.: US 11,943,602 B1
(45) Date of Patent: *Mar. 26, 2024

(54) SYSTEMS AND METHODS FOR SPATIAL UPDATE LATENCY COMPENSATION FOR HEAD-TRACKED AUDIO

(71) Applicant: Meta Platforms Technologies, LLC, Menlo Park, CA (US)

(72) Inventors: William Owen Brimijoin, II, Kirkland, WA (US); Henrik Gert Hassager, Seattle, WA (US); Sebastià Vicenç Amengual Garí, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/409,035

(22) Filed: Aug. 23, 2021

Related U.S. Application Data

(63) Continuation of application No. 16/727,374, filed on Dec. 26, 2019, now Pat. No. 11,102,602.

(51) Int. Cl.
| | |
|---|---|
| *H04S 7/00* | (2006.01) |
| *G02B 27/01* | (2006.01) |
| *G06F 3/01* | (2006.01) |
| *G06F 3/16* | (2006.01) |
| *H04R 1/20* | (2006.01) |

(52) U.S. Cl.
CPC .......... *H04S 7/303* (2013.01); *G02B 27/0179* (2013.01); *G06F 3/012* (2013.01); *G06F 3/165* (2013.01); *H04R 1/20* (2013.01); *G02B 2027/0187* (2013.01); *H04S 2420/01* (2013.01)

(58) Field of Classification Search
CPC ....... H04S 7/303; H04S 2420/01; H04R 1/20; G06F 3/012; G06F 3/165; G02B 27/0179; G02B 2027/0187
See application file for complete search history.

(56) References Cited

U.S. PATENT DOCUMENTS

| | | |
|---|---|---|
| 8,428,269 B1 | 4/2013 | Brungart et al. |
| 9,699,583 B1 | 7/2017 | Lyren et al. |
| 9,955,281 B1 | 4/2018 | Lyren et al. |
| 10,051,402 B1 | 8/2018 | Lyren et al. |

(Continued)

OTHER PUBLICATIONS

Notice of Allowance on U.S. Appl. No. 16/727,374 dated Apr. 19, 2021 (8 pages).

(Continued)

*Primary Examiner* — David L Ton
(74) *Attorney, Agent, or Firm* — Foley & Lardner LLP

(57) ABSTRACT

A system can include a position sensor configured to output position data of a HWD. The system can include one or more processors configured to identify a first head angle of the HWD using the position sensor, generate an audio signal using the first head angle, identify a second head angle of the HWD using the position sensor, determine an angle error based at least on the first head angle and the second head angle, and apply at least one of a time difference or a level difference to the audio signal based at least on the angle error to adjust the audio signal. The system can include an audio output device configured to output the adjusted audio signal. By adjusting the audio signal using the angle error, the system can correct for long spatial update latencies and reduce the perceptual impact of such latencies for the user.

20 Claims, 6 Drawing Sheets

(56) References Cited

U.S. PATENT DOCUMENTS

| | | |
|---|---|---|
| 10,708,706 B1 | 7/2020 | Brimijoin et al. |
| 2018/0139565 A1 | 5/2018 | Norris et al. |
| 2019/0174249 A1 | 6/2019 | Lyren et al. |
| 2020/0037091 A1 | 1/2020 | Jeon et al. |
| 2020/0045491 A1 | 2/2020 | Robinson et al. |
| 2020/0104620 A1 | 4/2020 | Cohen et al. |
| 2020/0260209 A1 | 8/2020 | Yadegari |
| 2020/0336858 A1 | 10/2020 | Brimijoin et al. |

OTHER PUBLICATIONS

U.S. Office Action on U.S. Appl. No. 16/727,374 dated Dec. 21, 2020.

SYSTEMS AND METHODS FOR SPATIAL UPDATE LATENCY COMPENSATION FOR HEAD-TRACKED AUDIO

CROSS-REFERENCE TO RELATED APPLICATIONS

The present application claims priority to and is a continuation of U.S. patent application Ser. No. 16/727,374, filed Dec. 26, 2019, the disclosure of which is incorporated herein by reference in its entirety.

FIELD OF THE DISCLOSURE

The present disclosure relates generally to audio systems for head worn displays. More particularly, the present disclosure relates to systems and methods for spatial update latency compensation for head-tracked audio.

BACKGROUND

Systems that output audio, including head worn displays (HWDs), can output the audio in a manner that allows the audio to be perceived by a user in particular locations relative to the user, such as relative to an orientation of the user's head. Because of processing and communication times involved in an audio output pipeline from the processors that generate the audio to the audio components (e.g., speakers) that output the audio, there may be latency between where the audio is perceived to be located and other information being provided to the user, such as images in a virtual reality (VR) setting.

SUMMARY

Various aspects of the present disclosure relate to systems and methods for spatial update latency compensation for head-tracked audio. A system can measure an amount the head has moved since position information was sent, and apply small changes in interaural level differences (ILD) and interaural time differences (ITD) to the incoming binaural signal. The system can compare the current head pose with the pose of the head that was measured at a time in the past (or predicted to be the current head pose) corresponding to the total round-trip latency of the system, and then apply appropriate ITDs and ILDs to the binaural signal. As such, the system can perform a lightweight computation that may be applied using low power.

The system can receive a measure of head angle from a position sensor, which can be part of the HWD. The system can provide the head angle to processors that generate the binaural audio signal for output by the HWD in accordance with the head angle. The processors can be onboard the HWD or implemented by a remote device, such as a phone in communication with the HWD by Bluetooth. The system can receive the audio signal, and compare the head angle that was used to generate the audio data to a current head angle to determine the angle error. The system may also compare the current head angle to a predicted head angle (e.g., predicted based on a state associated with a point in time at which the audio data is to be outputted) to determine the angle error.

The system can measure the round trip time between outputting the head angle and receiving the audio signal in order to identify the head angles to use to determine the angle error. The system can tag the audio signal with the time or angle at which it was rendered to facilitate determining the angle error.

The system can determine ITDs, ILDs, or both, to apply to the audio signal or portions thereof based on the angle error, which can enable the system to correct a perceived location of the audio signal for the user to compensate for the angle error. The system can apply various heuristics when generating and applying the corrections, such as to account for multiple sources (e.g., as more sources are present, less compensation may be needed), focusing on a prominent or other particular source, or adjusting compensation based on a height of the location of the source (e.g., in addition to azimuthal angle).

At least one aspect relates to a method. The method can include identifying, by one or more processors, a first head angle of a head worn display (HWD). The method can include generating, by the one or more processors, an audio signal using the first head angle. The method can include identifying, by the one or more processors, a second head angle of the HWD. The method can include determining, by the one or more processors, an angle error based at least on the first head angle and the second head angle. The method can include applying, by the one or more processors, at least one of a time difference or a level difference to the audio signal based at least on the angle error to adjust the audio signal. The method can include outputting, by the one or more processors, the adjusted audio signal.

At least one aspect relates to a head worn display (HWD). The HWD can include a position sensor configured to output position data. The HWD can include one or more processors configured to identify a first head angle of the HWD using the position sensor, generate an audio signal using the first head angle, identify a second head angle of the HWD using the position sensor, determine an angle error based at least on the first head angle and the second head angle, and apply at least one of a time difference or a level difference to the audio signal based at least on the angle error to adjust the audio signal. The system can include an audio output device configured to output the adjusted audio signal.

At least one aspect relates to a computer-readable medium. The computer-readable medium can include processor-executable instructions that when executed by one or more processors, cause the one or more processors to detect a first head angle of a head worn display (HWD), generate an audio signal using the first head angle, detect a second head angle of the HWD, determine an angle error based at least on the first head angle and the second head angle, apply at least one of a time difference or a level difference to the audio signal based at least on the angle error to adjust the audio signal, and output the adjusted audio signal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
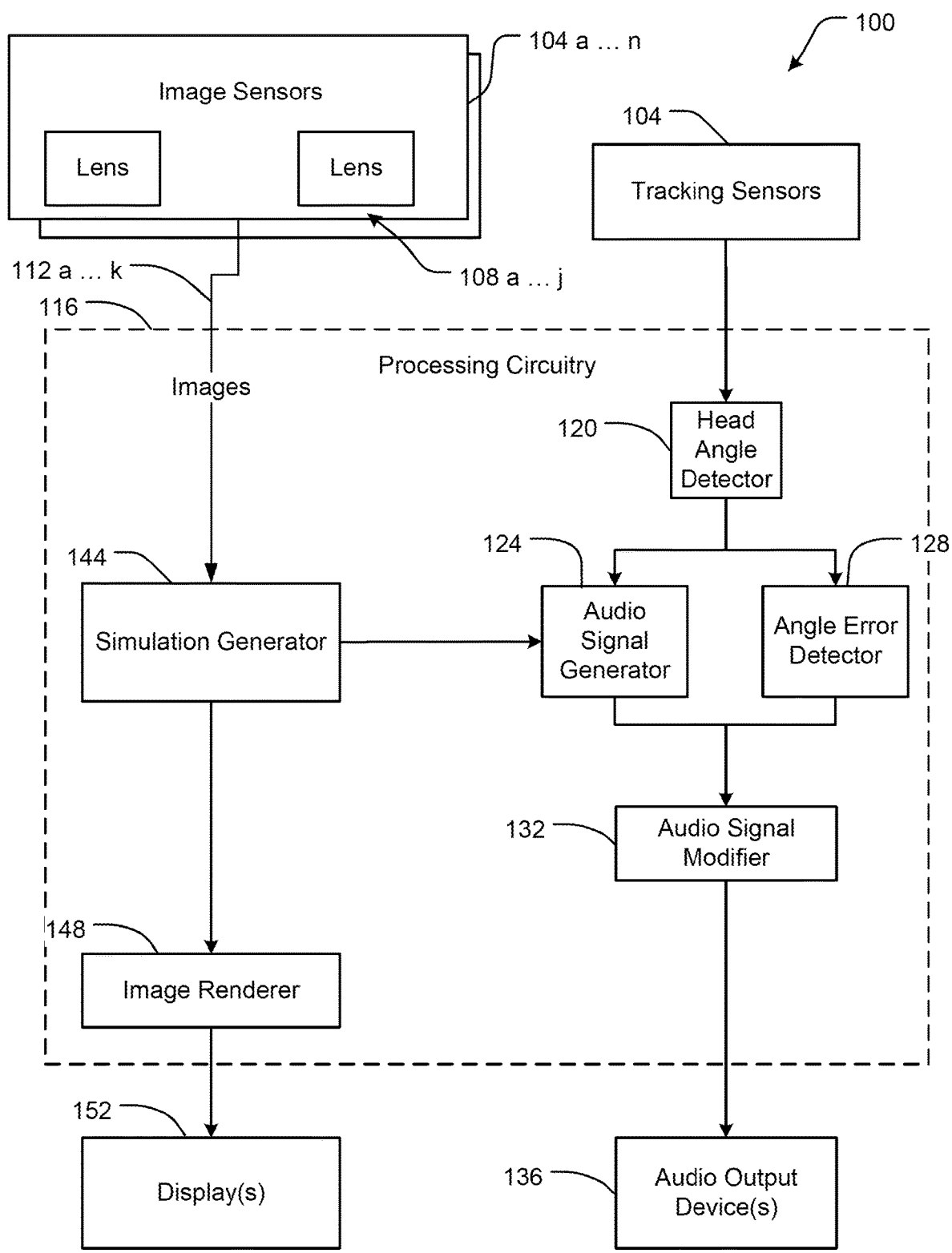
FIG. 1 is a block diagram of an augmented reality/virtual reality (AR/VR) system according to an implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Various systems that generate and output audio for a user, including but not limited to head worn displays (HWDs) or head mounted displays (HMDs) that provide audio as part of an augment reality (AR) or virtual reality (VR) system, may provide the audio in a manner in which the audio is expected to be perceived by the user at particular locations. For example, the system may provide image content that includes an object to be displayed to the user, at a particular angle relative to an angle of the head of the user, such that the user is expected to perceive the audio to be coming from the object. Such systems may, for example, provide world-locked spatial audio.

Various devices may provide output that includes audio or haptic output to a user. For example, wearable devices, including HMDs, may provide such output via direct or indirect contact with skin, cartilage, or bone of the user (or using a combination of some of these). The devices may be associated or form part of an augmented reality (AR) or virtual reality (VR) system. For example, content delivered by such systems may include image, video, audio, or haptic output, or any combination thereof, any of which may be presented in one or more channels.

AR and VR systems can use an HMD (may also be referred to as a head-worn display (HWD)) to present images to a user to represent an augmented or virtual environment (e.g., simulated environment). The HMD can present the images so that the images are perceived with realistic depth. For example, the HMD can be used to present images that can be viewed stereoscopically, such as by sequentially or simultaneously presenting left eye images and right eye images, enabling a user to perceive a 3D environment. An AR system can present images using an at least partially transparent display, enabling the presented images to be perceived together with a real-world environment. A VR system can generate the images based on operating an application that generates display data regarding the virtual environment, and updates the display data responsive to interactions of the user with the virtual environment. The AR or VR system can include the HMD (e.g., headset), which can be worn by the user to present the display data to the user, as well as one or more hand devices, such as hand-held controllers, that can be manipulated by the user as the user interacts with the virtual environment. The AR or VR system can use any of a variety of audio and haptic output devices, such as transducers, speakers, and other movable members, to provide audio or haptic output together with or independently from images.

As the system tracks the head of the user, generates an audio signal (e.g., performs a room acoustic computation; generates a binaural audio signal), and causes audio (e.g., sounds) to be outputted based on the audio signal, there may be latency. For example, there may be latency between when and where the audio is outputted and when and where the audio is expected to be outputted relative to other information being provided to the user, such as image data being provided to the user. The result can be an auditory environment that does not appear stable as the head turns. Latency can occur when head tracking, room acoustics computation, and any other audio processing, such as head related transfer function (HRTF) filtering, are all performed in a single device, and may be even longer if any information is to be transmitted back and forth between more than one device. For example, because the processing operations involved in rendering realistic room acoustics and performing HRTF convolution can have high demands on processing hardware, at least some of these operations may be performed by hardware remote from other hardware (e.g., remote from the HWD), which can result in additional latency in the transmission of head position data from the HWD and the packaging and transmission of the audio signal back to the HWD. For example, when the spatial update of a sound source location is delayed by more than 60 ms in VR (e.g., a motion-to-audio latency), or more than 30 ms in AR, the sound image can be perceived to drag with the head and then reset in its location. With respect to communication between multiple devices involved in processing and outputting the audio, such communications may be performed using a Bluetooth protocol, which can take upwards of 150 ms to transmit audio, which can be far above the perceptual thresholds noted above. As such, latencies generated in such systems can noticeably affect realism and externalization, which can result in an apparently intracranial percept of a moving sound.

Systems and methods in accordance with certain aspects of the present solution can perform operations to compensate for various such sources of latency to cause an improved perception of audio, including head-tracked audio. For example, a system can include a position sensor configured to output position data of a HWD. The system can include one or more processors configured to identify a first head angle of the HWD using the position sensor, generate an audio signal using the first head angle, identify a second head angle of the HWD using the position sensor, determine an angle error based at least on the first head angle and the second head angle, and apply at least one of a time difference or a level difference to the audio signal based at least on the angle error to adjust the audio signal. The system can include an audio output device configured to output the adjusted audio signal. By adjusting the audio signal using the angle error, the system can correct for long spatial update latencies and reduce the perceptual impact of such latencies for the user.

The system can receive a measure of head angle from a position sensor, which can be part of the HWD. The system can provide the head angle to processors that generate the binaural audio signal for output by the HWD in accordance with the head angle. The processors can be onboard the HWD or implemented by a remote device, such as a phone in communication with the HWD by Bluetooth. The system can receive the audio signal, and compare the head angle that was used to generate the audio data to a current head angle to determine the angle error. The system may also compare the current head angle to a predicted head angle (e.g., predicted based on a state associated with a point in time at which the audio data is to be outputted) to determine the angle error.

The system can measure the round trip time between outputting the head angle and receiving the audio signal in order to identify the head angles to use to determine the angle error. The system can tag the audio signal with the time or angle at which it was rendered to facilitate determining the angle error.

The system can determine ITDs, ILDs, or both, to apply to the audio signal or portions thereof based on the angle error, which can enable the system to correct a perceived location of the audio signal for the user to compensate for the angle error. The system can apply various heuristics when generating and applying the corrections, such as to account for multiple sources (e.g., as more sources are present, less compensation may be needed), focusing on a prominent or other particular source, or adjusting compensation based on a height of the location of the source (e.g., in addition to azimuthal angle).

Referring now to FIG. 1, a system 100 can be used to perform compensation of spatial update latency for audio signals, including head-tracked audio signals provided using binaural audio. While the system 100 is depicted in FIG. 1 as performing such operations along with an image processing pipeline, various aspects of the system 100 may or may not be performed together with image processing operations.

The system 100 can include a plurality of sensors 104a . . . n, processing circuitry 116, and one or more displays 152. The system 100 can be implemented using the HMD system 200 described with reference to FIG. 2, the headset 300 described with reference to FIG. 3, the audio system 400 described with reference to FIG. 400, the computing environment described with reference to FIG. 6, or any combination thereof. The system 100 can incorporate features of and be used to implement features of AR and VR systems. At least some of the processing circuitry 116 can be implemented using a graphics processing unit (GPU). The functions of the processing circuitry 116 can be executed in a distributed manner using a plurality of processing units.

The processing circuitry 116 may include one or more circuits, processors, and/or hardware components. The processing circuitry 116 may implement any logic, functions or instructions to perform any of the operations described herein. The processing circuitry 116 can include any type and form of executable instructions executable by any of the circuits, processors or hardware components. The executable instructions may be of any type including applications, programs, services, tasks, scripts, libraries processes and/or firmware. Any of the components of the processing circuitry 116 including but not limited to head angle detector 120, audio signal generator 124, angle error detector 128, audio signal modifier 132, simulation generator 144, and image renderer 148 may be any combination or arrangement of hardware, circuitry and executable instructions to perform their respective functions and operations. At least some portions of the processing circuitry 116 can be used to implement image processing executed by the sensors 104.

The processing circuitry 116 and components thereof may be implemented using multiple hardware devices, which can enable certain devices to have relatively lightweight form factors while using other devices to perform more computationally intensive operations. For example, a portion of the processing circuitry 116 implemented using hardware of the HWD can provide head angle data (or position or orientation data used to determine head angle) to other portions of processing circuitry 116 remote from the HWD that generates audio signal data using the head angle data. The portions of the processing circuitry 116 can communicate using various communication protocols, including but not limited to Bluetooth protocols (which may have latency associated with communicating head angle data and audio signal data). In some implementations, audio signal generator 124 and simulation generator 144 are implemented using processing circuitry 116 of a device remote from the HWD, while audio signal modifier 132 is implemented using processing circuitry 116 of the HWD, as the operations described with reference to audio signal modifier 132 may have relatively low computational intensity, and thus can be performed with relatively lightweight processing electronics without introducing significant processing latencies.

The sensors 104a . . . n can be image capture devices or cameras, including video cameras. The sensors 104a . . . n may be cameras that generate images of relatively low quality (e.g., relatively low sharpness, resolution, or dynamic range), which can help reduce the SWAP of the system 100. For example, the sensors 104a . . . n can generate images having resolutions on the order of hundreds of pixels by hundreds of pixels. At the same time, the processes executed by the system 100 as described herein can be used to generate display images for presentation to a user that have desired quality characteristics, including depth characteristics.

The sensors 104a . . . n (generally referred herein as sensors 104) can include any type of one or more cameras. The cameras can be visible light cameras (e.g., color or black and white), infrared cameras, or combinations thereof. The sensors 104a . . . n can each include one or more lenses 108 a . . . j generally referred herein as lens 108). In some embodiments, the sensor 104 can include a camera for each lens 108. In some embodiments, the sensor 104 include a single camera with multiple lenses 108 a . . . j. In some embodiments, the sensor 104 can include multiple cameras, each with multiple lenses 108. The one or more cameras of the sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD. The one or more cameras may be used for multiple purposes, such as tracking objects in a scene or an environment captured by the image capture devices and performing the collision detection techniques described herein.

The one or more cameras of the sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

The system 100 can include a first sensor (e.g., image capture device) 104a that includes a first lens 108a, the first sensor 104a arranged to capture a first image 112a of a first view, and a second sensor 104b that includes a second lens 108b, the second sensor 104b arranged to capture a second image 112b of a second view. The first view and the second view may correspond to different perspectives, enabling depth information to be extracted from the first image 112a and second image 112b. For example, the first view may correspond to a left eye view, and the second view may correspond to a right eye view. The system 100 can include a third sensor 104c that includes a third lens 108c, the third sensor 104c arranged to capture a third image 112c of a third view. As described with reference to FIG. 2, the third view may correspond to a top view that is spaced from an axis between the first lens 108a and the second lens 108b, which can enable the system 100 to more effectively handle depth information that may be difficult to address with the first sensor 104a and second sensor 104b, such as edges (e.g., an edge of a table) that are substantially parallel to the axis between the first lens 108a and the second lens 108b.

Light of an image to be captured by the sensors 104a . . . n can be received through the one or more lenses 108 a . . . j. The sensors 104a . . . n can include sensor circuitry, including but not limited to charge-coupled device (CCD) or complementary metal-oxide-semiconductor (CMOS) circuitry, which can detect the light received via the one or more lenses 108a . . . j and generate images 112a . . . k based on the received light. For example, the sensors 104a . . . n can use the sensor circuitry to generate the first image 112a corresponding to the first view and the second image 112b corresponding to the second view. The one or more sensors 104a . . . n can provide the images 112a . . . k to the processing circuitry 116. The one or more sensors 104a . . . n can provide the images 112a . . . k with a corresponding timestamp, which can facilitate synchronization of the images 112a . . . k when image processing is executed on the images 112a . . . k.

Figure 2:
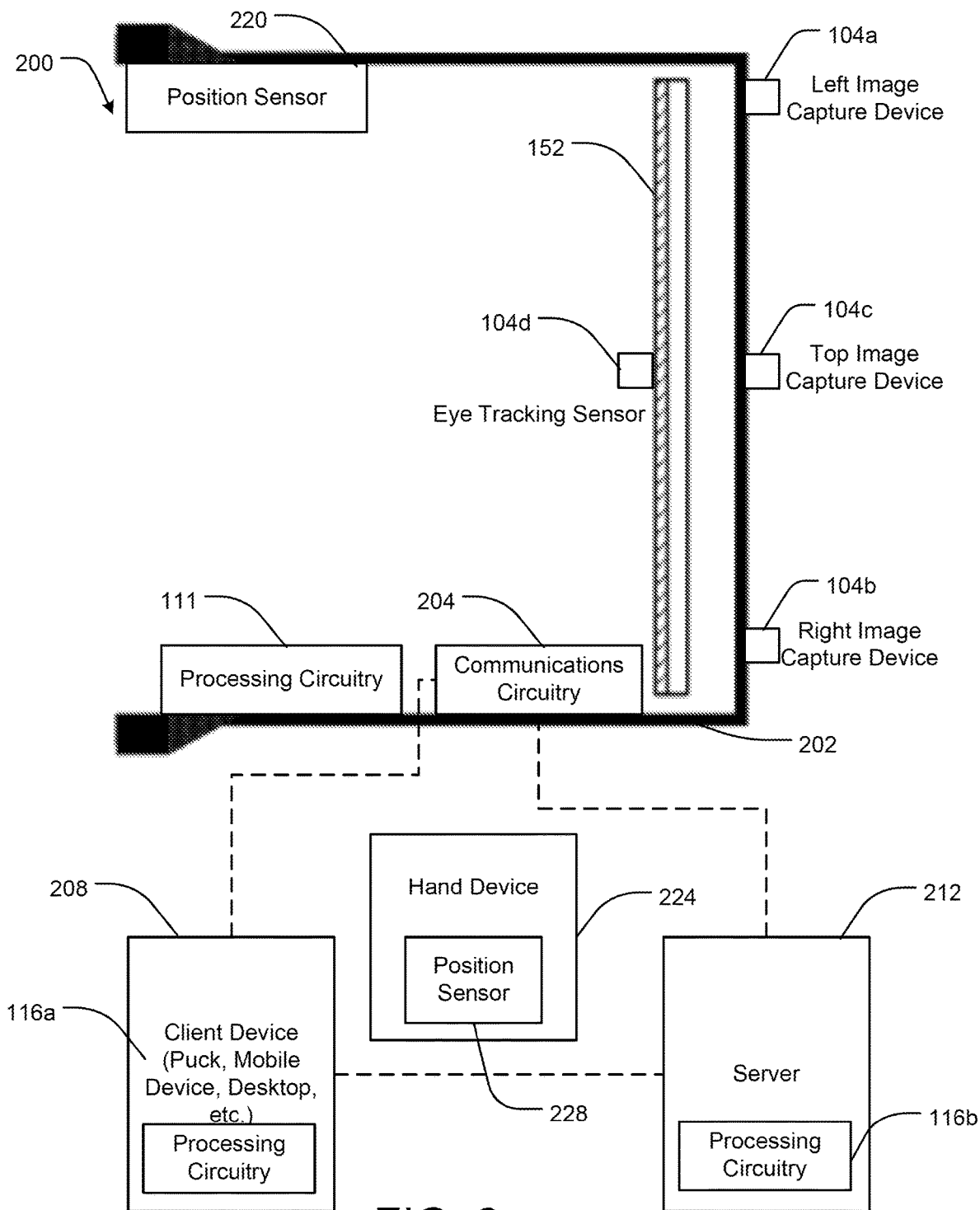
FIG. 2 is a schematic diagram of a head-mounted display (HMD) system according to an implementation of the present disclosure.

The sensors 104 can include eye tracking sensors 104 or head tracking sensors 104 that can provide information such as positions, orientations, or gaze directions of the eyes or head of the user (e.g., wearer) of an HMD. In some embodiments, the sensors 104 are inside out tracking cameras configured to provide images for head tracking operations. The sensors 104 can be eye tracking sensors 104 that provide eye tracking data, such as data corresponding to at least one of a position or an orientation of one or both eyes of the user. In some embodiments, the sensors 104 optically measure eye motion, such as by emitting light (e.g., infrared light) towards the eyes and detecting reflections of the emitted light. The sensors 104 can be oriented in a direction towards the eyes of the user (e.g., as compared to sensors 104 that capture images of an environment outside of the HMD). For example, the sensors 104 can include at least one fourth sensor 104d (e.g., as illustrated in FIG. 2) which can be oriented towards the eyes of the user to detect sensor data regarding the eyes of the user. In some embodiments, the head tracking sensors 104 generate motion data including at least one of a position, a velocity, or an acceleration of the head (e.g., of the HMD). The sensors 104 can include an inertial measurement unit (IMU), simultaneous localization and mapping (SLAM) camera system, magnetic tracker (e.g., magnetometer), or any combination thereof to perform the head tracking.

The sensors 104 can include hand tracking sensors 104 that can provide information such as positions or orientations of one or more hands of the user. The hand tracking sensors 104 can generate motion data including at least one of a position, a velocity, or an acceleration of a respective hand (e.g., of a hand device 224 manipulated by the hand as described with reference to FIG. 2). The head tracking sensors 104 and hand tracking sensors 104 can include any of a variety of position sensors, such as an inertial measurement unit (IMU), an accelerometer, a gyroscope, a magnetometer (e.g., magnetic compass), or any combination thereof. The sensors 104 can include various body position sensors such as leg sensors or torso sensors.

The sensors 104 can capture images 112 of an environment around the sensors 104. For example, the sensors 104 can capture images 112 of an environment in or around a field of view of the user of the HMD. The images 112 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by the images 112 captured by the sensors.

The processing circuitry 116 can update, maintain, and selectively allow or prevent access to transmission of data associated with a user, including but not limited to head tracking data, eye tracking data, user profile data, or various data associated with models 124. For example, the processing circuitry 116 may use as inputs, personal or biometric information of a user for user-authentication or experience-personalization purposes. A user may opt to make use of these functionalities, such as to enhance their experience using the system 100 or various devices associated with or in communication with one or more components of the system 100.

As an example, a user may provide personal or biometric information to the system 100. The user's privacy settings may specify that such information may be used only for particular processes, such as authentication, and further specify that such information may not be shared with any third-party system or used for other processes or applications associated with the system 100 (or another system in communication with the system 100, such as a social network). The user's privacy setting may specify that data received or detected by the system 100, such as images, sensor data, eye tracking data, biometric data, or data, may be used only for a limited purpose (e.g., authentication, operation of selected component(s) of the system 100), and further specify that such data may not be shared with any third-party system or used by other processes or applications associated with the system 100 or devices in communication with the system 100. The user's privacy setting may specify that the system 100 does not perform operations to detect (or store, or transmit) particular data, such as head tracking data or eye tracking data, unless the system 100 identifies that the privacy setting indicates permission to detect (or store, or transmit) the data.

The processing circuitry 116 can include a head angle detector 120. The head angle detector 120 can include any function, operation, routine, logic, or instructions to perform functions such as identifying or determining a head angle of the user or a device worn by the user (e.g., HWD) using information from one or more sensors 104. While FIG. 1 depicts the head angle detector 120 as implemented by the processing circuitry 116, at least a portion of the head angle detector 120 can be implemented by the sensors 104, such as to provide a head angle directly from the sensors 104 to the processing circuitry 116 and components thereof.

The head angle detector 120 can identify a head angle of the HWD. The head angle detector 120 can identify the head angle using position or orientation data from the sensor 104, such as by requesting an orientation angle from the sensor 104 or periodically receiving the head angle from the sensor. The head angle detector 120 can assign a time stamp to the head angle based on a time at which the head angle is identified, which can enable the head angle detector 120 to provide values associated with changes in head angle between points in time. The head angle detector 120 can provide the head angle as an azimuth angle in a plane parallel to the ground (e.g., perpendicular to a gravity vector). The head angle detector 120 can provide the head angle relative to a reference angle, which may be an angle associated with a forward direction of movement, or based on angles provided by the sensor 104.

The head angle detector 120 can identify the head angle at various points in time. For example, the head angle detector 120 can identify the head angle responsive to receiving a request for the angle from various other components of the processing circuitry 116, such as audio signal generator 124. The head angle detector 120 can maintain a database (e.g., head angle buffer) of head angles and identifiers assigned to the head angles, such as time stamps, unique identifiers, metadata received from the sensor 104 with respect to the head angles, or various combinations thereof. The head angle detector 120 may maintain head angle values for at least as far back as a round trip latency (e.g., if the round trip latency is 100 ms, maintain head angle values for the last 100 ms, or for a threshold or factor applied to the round trip latency, such as 100 ms plus 50 ms threshold for a total of 150 ms of head angles, or 100 ms times a factor of two for a total 200 ms of head angles).

The head angle detector 120 can identify the head angle based at least on a latency associated with generating the audio signal (e.g., by audio signal generator 124). For example, the head angle detector 120 can determine the latency and compare the latency to a current time to a time difference between the current time and a previous time at which the audio signal was generated to determine the previous time, and retrieve the head angle corresponding to the previous time to identify the head angle. As discussed further herein, by identifying the head angle corresponding to the previous time (at which the audio signal was generated), the processing circuitry 116 can determine how to compensate for latency effects when causing output of the audio.

The head angle detector 120 can determine the latency using information such as time used to generate the audio signal and time used to transmit information to component(s) that generate the audio signal (e.g., via Bluetooth or other network communications between the HWD and a remote device that implements audio signal generator 124). For example, the head angle detector 120, angle error detector 128, or audio signal generator 124 can measure a round trip time between providing a head angle to audio signal generator 124 and receiving the audio signal from audio signal generator 124. The head angle generator 120 can provide the head angle to the audio signal generator 124 using a data structure that includes a time stamp, a unique identifier, or a combination thereof assigned to the head angle, and the audio signal generator 124 can output the audio signal using a data structure that includes the time stamp, unique identifier, or combination thereof assigned to the head angle, to facilitate determination of the round trip time when the head angle is received.

The processing circuitry can include an audio signal generator 124. The audio signal generator 124 can include any function, operation, routine, logic, or instructions to perform functions such as generating an audio signal to be outputted by audio output devices 136 for perception by the user. While FIG. 1 depicts the audio signal generator 124 as a component separate from simulation generator 144, the audio signal generator 124 can be implemented as part of simulation generator 144. The audio signal generator 124 can generate the audio signal using information received from simulation generator 144, such as information indicating a spatial location (e.g., at least one of azimuth angle or elevation angle) at which to provide the audio signal. The audio signal generator 124 can generate the audio signal to include binaural audio data. The audio signal generator 124 can generate the audio signal to include amplitude and frequency information assigned to various spatial locations relative to the head of the user. The audio signal generator 124 can generate the audio signal as a multiplexed audio signal that can include multiple audio streams, such as multiple audio streams each assigned to separate audio channels.

The audio signal generator 124 can generate the audio signal using the head angle identified by the head angle detector 120. For example, the audio signal generator 124 can determine initial audio signal data in a frame of reference of the head of the user (e.g., frame of reference of the HWD), and apply the head angle to the initial audio signal data to map the audio signal to a location at which the audio is to be perceived by the user. For example, the audio signal generator 124 can identify at least one of an azimuth angle or an elevation angle assigned to the audio signal data (or a portion thereof), and adjust the at least one of the azimuth angle or the elevation angle using the head angle. For example, if an audio signal is to be perceived from an azimuth angle of ten degrees in a global frame of reference (e.g., to be perceived as coming from ten degrees to the right of a north direction), and the head angle is negative thirty degrees in azimuth (e.g., thirty degrees left of north), the audio signal generator 124 can cause the audio signal to be outputted to be perceived at negative twenty degrees in azimuth.

The processing circuitry 116 can include an angle error detector 128. The angle error detector 128 can include any function, operation, routine, logic, or instructions to perform operations such as determining errors between angles used to generate the audio signals and angles to which the HWD has moved, enabling the processing circuitry 116 to compensate for latency in the audio processing pipeline and more accurately output the audio signals. The angle error detector 128 can sample the head angle detector 120 (or sample the sensor 104 directly, where the sensor 104 implements at least some functionality of the head angle detector 120) to retrieve head angles, such as to request head angles using a time stamp or other identifier that corresponds to the head angle to be retrieved. The angle error detector 128 can determine the angle error by comparing a head angle used to generate the audio signal to a head angle measured at a time at which the audio signal is to be outputted or a head angle predicted to be the angle at the HWD will be located when the audio signal is outputted.

The angle error detector 128 can determine an angle error using head angles detected by the head angle detector 120. The angle error detector 128 can determine the angle error using previous head angles used to generate the audio signal, predictions of where the HWD is expected to be angled, current head angles, or various combinations thereof to determine the angle error. The angle error detector 128 can use time stamps assigned to head angles to retrieve the head angles to be compared to one another to determine the angle error. As discussed below, the angle error detector 128 can determine various types of angle errors (e.g., based on known head angles, predicted angles, or various combinations thereof), and may assign an identifier of the type of angle error to the angle error, enabling other portions of the processing circuitry 116, such as audio signal modifier 132, to effectively perform operations in response to the angle error (e.g., apply modifications of different magnitude depending on whether the angle error is determined using actual head angles or predicted head angles).

For example, the angle error detector 128 can determine the angle error using a difference between a head angle of a current point in time (e.g., a second head angle) and a previous head angle (e.g., a first head angle) used to generate the audio signal to be outputted at the current point in time. The angle error detector 128 can determine the angle error by comparing the head angles, such as by subtracting one of the head angles from the other (e.g., subtract the first head angle from the second head angle). The angle error detector 128 can use the head angle detector 120 to identify the first head angle using a time stamp (e.g., first time stamp) assigned to the first head angle, such as by causing the head angle detector 120 to determine a latency between when the first head angle was provided to the audio signal generator 124 and when the resulting audio signal is received to be outputted at the current point in time (e.g., subtract the latency from a second time stamp corresponding to the current point in time to identify the first time stamp, and retrieve the head angle corresponding to the first time stamp to use as the first head angle).

In some implementations, the head angle detector 120 predicts what the head angle is expected to be at the current point in time (e.g., a future point in time at which the audio signal generated using the head angle is expected to be outputted), in order to provide the head angle to the angle error detector 128 for the angle error detector 128 to determine the head angle error. For example, the head angle detector 120 can include a head angle model. The head angle model can be any function, filter, algorithm, or machine learning model (e.g., neural network, regression function, classifier) that receives inputs and outputs predicted head angles responsive to the inputs. The head angle model can include a Kalman filter. The head angle model can receive various inputs, including but not limited to one or more previous head angles, information regarding measured movement of the head (e.g., position, velocity, or acceleration information received from sensors 104), information regarding expected movements of the head (which may be received or determined based on information from simulation generator 144), information regarding latency or other indications of time that will have passed since the audio signal was generated, distributions of expected head angles or movements of the head given a starting head angle (e.g., a histogram or function indicating a likelihood of the head angle being a particular head angle or range of head angles, such as given the starting head angle), or various combinations thereof. As an example, the head angle model can use the first head angle and a rate of angular velocity of the HWD to predict the current head angle.

For example, the head angle detector 120 can determine a predicted head angle (e.g., third head angle) indicating where the HWD is expected to be at the current point in time (which may be a future point in time relative to when the head angle detector 120 predicts the predicted head angle) using (1) the first head angle that is provided to the audio signal generator 124 to generate the audio signal for output at the current point in time and (2) a time difference between when the first head angle is measured or provided to the head angle detector 120 and an expected time at which the audio signal is to be outputted (e.g., between when the first head angle is measured and the current point in time); this time difference can be used by the head angle detector 120 in determining how much the head angle is expected to change given the time difference. The head angle detector 120 can provide the first head angle to the head angle model to determine the predicted head angle.

The angle error detector 128 can compare the predicted head angle to the current head angle to determine the angle error (e.g., subtract the predicted head angle from the current head angle to determine the angle error). As such, the angle error detector 128 can determine the angle error by comparing the current head angle to the previous head angle (e.g., comparing second head angle to first head angle), or by comparing the current head angle to the predicted head angle (e.g., comparing second head angle to third head angle, which can be used instead of the comparison of the current head angle and the previous head angle).

The processing circuitry 116 can include an audio signal modifier 132. The audio signal modifier 132 can include any function, operation, routine, logic, or instructions to perform functions such as adjusting how the audio signal is outputted, such as to use the angle error determined by the angle error detector 128 (e.g., based on comparing the current head angle to the previous head angle or to the predicted head angle) to compensate for the angle error. The audio signal modifier 132 can adjust the audio signal so that angles at which the audio is perceived by a user more accurately correspond to where a user would expect to the audio to be perceived, such as to more closely match spatial locations of objects presented to the user (e.g., via images) that the user would expect to be generating the audio signals. The audio signal modifier 132 can adjust the audio signal by controlling timing, levels, or various combinations thereof associated without output of the audio signal. The audio signal modifier 132 can be implemented as part of the audio signal generator 124. As depicted in FIG. 1, the audio signal modifier 132 can receive the audio signal from the audio signal generator 124, receive the angle error from the angle error detector 128, and adjust the audio signal based at least on the angle error to output an adjusted audio signal for output by audio output devices 136. The audio signal modifier 132 can apply various adjustments to various audio channels or streams, such as if the audio signal is a multiplexed audio signal.

The audio signal modifier 132 can apply at least one of a time difference or a level difference to the audio signal, using the angle error, to adjust the audio signal. For example, the audio signal modifier 132 can modify an interaural time difference (ITD) of the audio signal to apply the time difference to the audio signal. The ITD can be a difference in arrival time of sound corresponding to the audio signal between ears of the user, such as a difference between when the audio signal is provided via one or more left channels and via one or more right channels. The audio signal modifier 132 can use various mappings, lookup tables, functions, or other operations to determine the ITD using the angle error. For example, the audio signal modifier 132 can use a magnitude and direction (e.g., positive or negative value of the angle error) to determine the ITD. For example, if the angle error is negative twenty degrees in azimuth (indicating that the HWD is angled twenty degrees to the left in azimuth relative to the head angle that was used to generate the audio signal, such that the audio signal may be perceived to the right of where it should be), the audio signal modifier 132 can determine the ITD to at least partially decrease the angle error from negative twenty degrees to zero degrees, such as to delay a right channel of the audio signal relative to a left channel (or advance the left channel relative to the right channel).

The audio signal modifier 132 can modify an interaural level difference (ILD) to apply the level difference to the audio signal. The ILD can correspond to a difference in perceived loudness and frequency distribution between ears of the user. The ILD can correspond to a difference in level of the audio signal provided via one or more left channels and via one or more right channels. The audio signal modifier 132 can use various mappings, lookup tables, functions, or other operations to determine the ILD using the angle error. For example, the audio signal modifier 132 can use a magnitude and direction (e.g., positive or negative value of the angle error) to determine the ILD. For example, if the angle error is negative twenty degrees in azimuth (indicating that the HWD is angled twenty degrees to the left in azimuth relative to the head angle that was used to generate the audio signal, such that the audio signal may be perceived to the right of where it should be), the audio signal modifier 132 can determine the ILD to at least partially decrease the angle error from negative twenty degrees to zero degrees, such as to decrease a level of a right channel of the audio signal relative to a left channel (or increase the left channel relative to the right channel).

The audio signal modifier 132 can adjust the audio signal using both ITDs and ILDs. For example, the audio signal modifier 132 can modify both the ITD and the ILD (or apply changes using determined ITD and ILD values) to adjust the audio signal. The audio signal modifier 132 can use a single mapping, lookup table, function, or other operation that receives the angle error as an input and outputs both an ITD and an ILD that the audio signal modifier 132 applies to the audio signal to adjust the audio signal. For example, the audio signal modifier 132 can provide the angle error as input to a system of two equations that fit ITD and ILD outputs to the angle error (e.g., since time and level differences may not be uniform across azimuth, which may make it useful to cause both ITD and ILD changes) to determine the ITD and ILD changes.

The audio signal modifier 132 can perform the adjustment to the audio signal, using ITDs, using a playback buffer. For example, the audio signal modifier 132 can maintain a playback buffer of a predetermined duration of audio data (e.g., 500 ms; 700 ms, which can correspond to maximum possible interaural time difference). The audio signal modifier 132 can retrieve a portion of audio data from the playback buffer corresponding to the determined ITD and delay (or advance) one or more audio channels using the retrieved portion of the audio data.

The audio signal modifier 132 can perform the adjustment to the audio signal, using ILDs, by applying a scalar value (e.g., scalar multiplier) to one or both of left and right channels. The audio signal modifier 132 can perform the adjust to the audio signal, using ILDs, using a biquad filter or zero pole filter than allows an approximation of the frequency-dependent level differences that result from the acoustic shadow of the head.

In some implementations, the audio signal modifier 132 identifies a frequency characteristic of the audio signal and controls the ITD and ILD using the frequency characteristic. For example, this can enable the audio signal modifier 132 to selectively combine ITD and ILD modifications at various frequency bands in which ITD or ILD modifications may have a more significant effect in the user's perception of the location of the audio signal. The frequency characteristic can include various characteristics, such as mean, standard deviation, or frequencies or frequency bands for which the level or intensity is above a threshold value. For example, the audio signal modifier 132 can implement one or more of the filters described above using the frequency characteristic as an input to the one or more filters.

In some implementations, the audio signal modifier 132 selectively determines whether to adjust the audio signal. For example, if the angle error is relatively small, the audio signal modifier 132 may determine to not adjust the audio signal, but rather provide the audio signal as generated by the audio signal generator 124 to audio output devices 136 for output without adjustments. This can enable the system 100 to avoid any computational processing times associated with determining the adjustments to the audio signal, which may be useful if such computational processing times are of a similar magnitude as a latency associated with the angle error. For example, the audio signal modifier 132 can compare the angle error to a threshold angle error, perform the operations described herein for adjusting the audio signal responsive to the angle error being greater than the threshold angle error, and not perform such operations (e.g., control operation of audio output devices 136 using the audio signal generated by the audio signal generator 124 rather than an adjusted audio signal) responsive to the angle error being less than the threshold angle error. The threshold angle error may correspond to an error small enough that a user may not be expected to perceive latency. The threshold angle error may be an angle error representative of a delay of 60 ms in VR or 30 ms in AR operations.

The direction in which ILDs or ILDs change may depend on whether the sound source being rendered is located in a front hemifield (e.g., azimuth angle greater than negative ninety degrees and less than positive ninety degrees) or a rear hemifield (e.g., azimuth angle less than negative ninety degrees or greater than positive ninety degrees). The audio signal modifier 132 may selectively determine whether to adjust the audio signal based on the angle for which the audio is to be perceived, such as if the angle is in the front hemifield or the rear hemifield. For example, the audio signal modifier 132 can determine to adjust the audio signal responsive to the angle of the audio signal being in the front hemifield (e.g., only perform latency compensation for signals at the front of the listener).

The audio signal can include a multiplexed audio signal that includes multiple audio streams. The audio signal may be multiplexed (e.g., by audio signal generator 124 or simulation generator 144) based on spatial locations (e.g., left and right channels), frequency spectra (e.g., low and high frequencies; low, mid, and high frequencies), or any combination thereof. This may enable the system 100 to perform a more faithful spatial rendering of the sound to be perceived by the user. The audio signal modifier 132 can perform adjustments to each of the audio streams, such as to perform ITD and ILD corrections to each of the audio streams. The processing circuitry 116 may compress each of the audio streams (e.g., using downsampling, decreased bitrate, psychoacoustically inspired spectrum multiplexing, or any combination thereof) of the multiplexed audio stream. As such, the system 100 can preserve a more stable spatial image (e.g., maximize source separate to increase spatial release from masking), even if the audio streams are compressed. For example, the audio signal can be multiplexed such that the audio scene is provided with a front hemisphere and a rear hemisphere (which may each be provided with respective binaural streams, such as using four total audio channels). The audio signal modifier 132 can modify the respective binaural stream provided to the front hemisphere and to the rear hemisphere, as the modification applied by the audio signal modifier 132 can be different for the front hemisphere and rear hemisphere (e.g., ITD/ILD changes in a first direction for signals at the front and a second direction opposite the first direction for signals at the rear). The audio signal modifier 132 can receive the head angle error from the angle error detector 128, determine a first modification (e.g., at least one of a first change to ITD or a first change to ILD) for the front hemisphere using the head angle error, modify the audio channels for the front hemisphere using the first modification, determine a second modification (e.g., at least one of a second change to ITD or a second change to ILD) for the rear hemisphere using the head angle error, and modify the audio channels for the rear hemisphere using the second modification.

The system 100 can include one or more audio output devices 136 that output the audio signal, including receiving the adjusted audio signal from the audio signal modifier 132 and output the adjusted audio signal. The audio output devices 136 can include various features of the audio system 400 described with reference to FIG. 4, such as transducers, including speakers, that output the audio signal for perception by the user. The audio output devices 136 can include multiple audio output devices 136 that may each provide sound corresponding to distinct audio channels, such as left and right channels. By outputting the audio signal that has been adjusted by the audio signal modifier 132 using the angle error determined by the angle error detector 128, the system 100 can compensate for spatial update latencies that may be introduced by movement of the HWD (e.g., movement of the head of the user) between when a head angle is used to generate the audio signal and when the audio signal is received for output by the audio output devices 136. The audio output devices 136 may include haptic devices that generate haptic feedback (e.g., vibrations) responsive to control signals from audio signal generator 124.

The processing circuitry 116 can include a simulation generator 144. The simulation generator 144 can include any function, operation, routine, logic, or instructions to perform functions such as operating an application, such as a game, trainer, or simulator, receive user input data, update the operation of the application based on the user input data, provide display data to the image renderer 148 to enable the image renderer 148 to render display images for displaying the virtual environment, and provide audio data to the audio signal generator 124 to enable the audio signal generator 124 to generate audio signals for output using audio output devices 136. The simulation generator 144 can receive sensor data from the sensors 104, such as data regarding movement of the head or hands of the user, process the sensor data or motion data to identify the user input data, and update the operation of the application based on the identified user input data. For example, the simulation generator 144 can detect a movement of a hand of the user, such as a swing, push, or pull, and use the movement as a user input for the application. The simulation generator 144 can generate depth buffer information corresponding to display data, enabling the image renderer 148 to render 3D image data.

The processing circuitry 116 can include an image renderer 148. The image renderer 148 can be a 3D image renderer. The image renderer 148 may use image related input data to process, generate and render display or presentation images to display or present on one or more display devices, such as via an HMD. The image renderer 148 can generate or create 2D images of a scene or view for display on display 152 and representing the scene or view in a 3D manner. The image renderer 148 can generate images for display on display 164 based on display data received from the simulation generator 144 (e.g., depth buffers received from the simulation generator 144). The display or presentation data to be rendered can include geometric models of 3D objects in the scene or view. The image renderer 148 may determine, compute or calculate the pixel values of the display or image data to be rendered to provide the desired or predetermined 3D image(s), such as 3D display data for the images 112 captured by the sensor 104.

The image renderer 148 can render frames of display data to one or more displays 152 based on temporal and/or spatial parameters. The image renderer 148 can render frames of image data sequentially in time, such as corresponding to times at which images are captured by the sensors 104 or at which frames of display data are received from simulation generator 144. The image renderer 148 can render frames of display data based on changes in position and/or orientation, such as the position and orientation of the HMD as indicated by sensors 104. The image renderer 148 can render frames of display data based on left-eye view(s) and right-eye view(s) such as displaying a left-eye view followed by a right-eye view or vice-versa.

The image renderer 148 can generate the display images using motion data regarding movement of the sensors 104. For example, the sensors 104 may change in at least one of position or orientation due to movement of a head of the user wearing an HMD that includes the sensors 104 (e.g., as described with reference to HMD system 200 of FIG. 2). The processing circuitry 116 can receive the sensor data from a position sensor (e.g., position sensor 220 described with reference to FIG. 2).

Although the image renderer 148 is shown as part of the processing circuitry 116, the image renderer may be formed as part of other processing circuitry of a separate device or component, such as the display device, for example within the HMD.

The system 100 can include one or more displays 152. The one or more displays 152 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 152 may have a refresh rate the same or different than a rate of refresh or frame rate of the processing circuitry 116 or the image renderer 148, the simulation generator 144, or the sensors 104.

Referring now to FIG. 2, in some implementations, an HMD system 200 can be used to implement the system 100. The HMD system 200 can include an HMD body 202, a left sensor 104a (e.g., left image capture device), a right sensor 104b (e.g., right image capture device), and the display 164. The HMD body 202 can have various form factors, such as glasses or a headset. The sensors 104a, 104b can be mounted to or integrated in the UMD body 202. The left sensor 104a can capture first images corresponding to a first view (e.g., left eye view), and the right sensor 104b can capture images corresponding to a second view (e.g., right eye view). In some embodiments, the HMD system 200 does not include image capture devices. The HMD system 200 can be used to implement VR functionality, such as to present a virtual environment via the display 164.

The UMD system 200 can include a top sensor 104c (e.g., top image capture device). The top sensor 104c can capture images corresponding to a third view different than the first view or the second view. For example, the top sensor 104c can be positioned between the left sensor 104a and right sensor 104b and above a baseline between the left sensor 104a and right sensor 104b. This can enable the top sensor 104c to capture images with depth information that may not be readily available to be extracted from the images captured by the left and right sensors 104a, 104b. For example, it may be difficult for depth information to be effectively extracted from images captured by the left and right sensors 104a, 104b in which edges (e.g., an edge of a table) are parallel to a baseline between the left and right sensors 104a, 104b. The top sensor 104c, being spaced from the baseline, can capture the third image to have a different perspective, and thus enable different depth information to be extracted from the third image, than the left and right sensors 104a, 104b.

The HMD system 200 can include processing circuitry 116, which can perform at least some of the functions described with reference to FIG. 1, including receiving sensor data from position sensors 104 (e.g., head tracking sensors) to detection movement of the HMD and generate warnings regarding potential collisions with obstacles based on the movement of the HMD.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208.

The HMD system 200 can be deployed using different architectures. In some embodiments, the HMD (e.g., HMD body 202 and components attached to the HMD body 202) comprises the processing circuitry 116 and is self-contained portable unit. In some embodiments, the HMD has portions of the processing circuitry 116 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 116 that work in cooperation with or in conjunction with processing circuitry, or portions thereof, of a desktop computing device. In some embodiments, the HMD has portions of the processing circuitry 116 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as generating display images of a virtual environment and rendering the display images to the display 164. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 3. The server 212 can implement any portion of the image and rendering processing pipeline described in connection with FIGS. 1 and 3, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202. As the image capture devices 104a, 104b, 104c can be fixed to the body 202 (e.g., at predetermined locations relative to the position sensor 220), the position sensor 220 can output at least one of a position or an orientation of each sensor 104a, 104b, 104c, which can be used for depth mapping of obstacles detected via the image capture devices 104a, 104b, 104c. The position sensor 220 can include at least one of an inertial measurement unit (IMU), an accelerometer, a gyroscope, or a magnetometer (e.g., magnetic compass).

The system 200 can include at least one hand device 224. The hand device 224 can be sized and shaped to be held by one or more hands of a user. The hand device 224 can operate as a user control device; for example, the hand device 224 can include various user interface elements (e.g., buttons, switches, toggles, etc.) that can be manipulated by a user to generate user inputs. For example, the hand device 224 can be used as a controller for interacting with a virtual environment being presented via the display 164 based on operation of an application by the HMD system 200. The hand device 224 can communicate with the communications circuitry 204, client device 208, and/or server 212 using various wired or wireless connections. The hand device 224 can include one or more position sensors 228, which can be similar to the position sensor 220. For example, the position sensor 228 can include at least one of an inertial measurement unit (IMU), an accelerometer, a gyroscope, or a magnetometer (e.g., magnetic compass), which can output sensor data including at least one of a position, a velocity, an acceleration, or an orientation of the hand device 224 in order for processing circuitry 116 to use the sensor data to detect movement of one or more hands of the user to determine whether to generate warnings regarding potential collisions between the one or more hands of the user and obstacles in a real world environment around the HMD 200.

Figure 3:
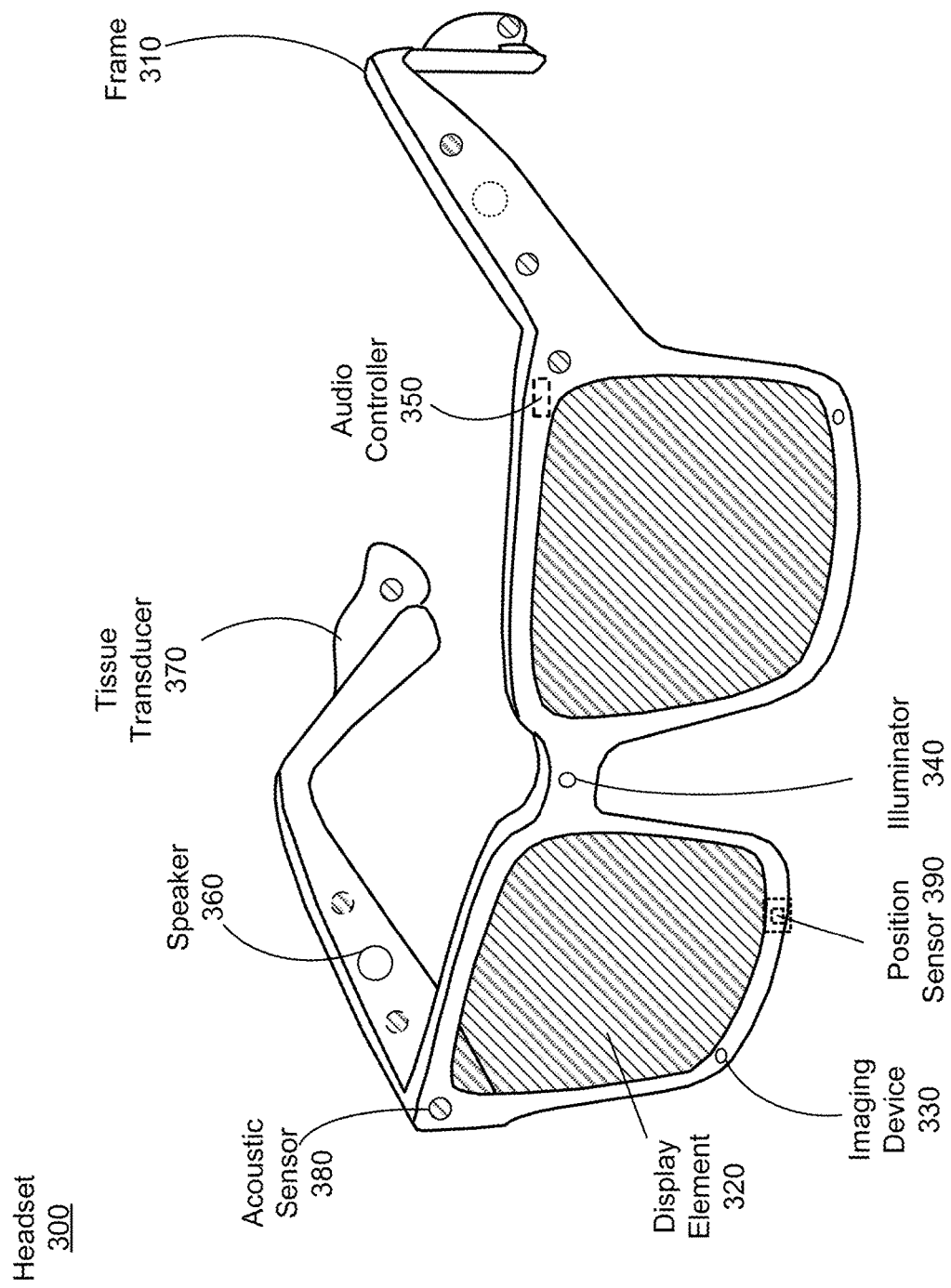
FIG. 3 is a perspective view of a headset implemented as an eyewear device according to an implementation of the present disclosure.

Referring now to FIG. 3, a headset 300 can be implemented as an HWD (e.g., as an eyewear device). In some embodiments, the eyewear device is a near eye display (NED). The headset 300 may be worn on the face of a user such that content (e.g., media content) is presented using a display assembly and/or an audio system. Examples of media content presented by the headset 300 include one or more images, video, audio, or some combination thereof. The headset 300 includes a frame, and may include, among other components, a display assembly including one or more display elements 320, a depth camera assembly (DCA), an audio system, and a position sensor 390. While FIG. 3 illustrates the components of the headset 300 in example locations on the headset 300, the components may be located elsewhere on the headset 300, on a peripheral device paired with the headset 300, or some combination thereof.

The frame 310 holds the other components of the headset 300. The frame 310 includes a front part that holds the one or more display elements 320 and end pieces (e.g., temples) to attach to a head of the user. The front part of the frame 310 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 320 provide light to a user wearing the headset 300. As illustrated the headset includes a display element 320 for each eye of a user. In some embodiments, a display element 320 generates image light that is provided to an eyebox of the headset 300. The eyebox is a location in space that an eye of user occupies while wearing the headset 300. For example, a display element 320 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 300. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. One or both of the display elements 320 may be opaque and not transmit light from a local area around the headset 300. The local area is the area surrounding the headset 300. For example, the local area may be a room that a user wearing the headset 300 is inside, or the user wearing the headset 300 may be outside and the local area is an outside area. One or both of the display elements 320 can be at least partially transparent, such that light from the local area may be combined with light from the one or more display elements to produce AR content.

The display element 320 may include an additional optics block (not shown). The optics block may include one or more optical elements (e.g., lens, Fresnel lens, etc.) that direct light from the display element 320 to the eyebox. The optics block may, e.g., correct for aberrations in some or all of the image content, magnify some or all of the image, or some combination thereof.

The DCA determines depth information for a portion of a local area surrounding the headset 300. The DCA includes one or more imaging devices 330 and a DCA controller (not shown in FIG. 3), and may also include an illuminator 340. In some embodiments, the illuminator 340 illuminates a portion of the local area with light. The light may be, e.g., structured light (e.g., dot pattern, bars, etc.) in the infrared (IR), IR flash for time-of-flight, etc. In some embodiments, the one or more imaging devices 330 capture images of the portion of the local area that include the light from the illuminator 340.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 340), some other technique to determine depth of a scene, or some combination thereof.

The audio system provides audio content. The audio system includes a transducer array, a sensor array, and an audio controller 350. Functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 360 or a tissue transducer 370 (e.g., a bone conduction transducer or a cartilage conduction transducer). Although the speakers 360 are shown exterior to the frame 310, the speakers 360 may be enclosed in the frame 310. In some embodiments, instead of individual speakers for each ear, the headset 300 includes a speaker array comprising multiple speakers integrated into the frame 310 to improve directionality of presented audio content. The tissue transducer 370 couples to the head of the user and directly vibrates tissue (e.g., bone or cartilage) of the user to generate sound.

The sensor array detects sounds within the local area of the headset 300. The sensor array includes a plurality of acoustic sensors 380. An acoustic sensor 380 captures sounds emitted from one or more sound sources in the local area (e.g., a room). Each acoustic sensor is configured to detect sound and convert the detected sound into an electronic format (analog or digital). The acoustic sensors 380 may be acoustic wave sensors, microphones, sound transducers, or similar sensors that are suitable for detecting sounds.

In some embodiments, one or more acoustic sensors 380 may be placed in an ear canal of each ear (e.g., acting as binaural microphones). In some embodiments, the acoustic sensors 380 may be placed on an exterior surface of the headset 300, placed on an interior surface of the headset 300, separate from the headset 300 (e.g., part of some other device), or some combination thereof. The number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 300.

The audio controller 350 processes information from the sensor array that describes sounds detected by the sensor array. The audio controller 350 may comprise a processor and a computer-readable storage medium. The audio controller 350 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 360, or some combination thereof.

The position sensor 390 generates one or more measurement signals in response to motion of the headset 300. The position sensor 390 may be located on a portion of the frame 310 of the headset 300. The position sensor 390 may include an inertial measurement unit (IMU). Examples of position sensor 390 include: one or more accelerometers, one or more gyroscopes, one or more magnetometers, another suitable type of sensor that detects motion, a type of sensor used for error correction of the IMU, or some combination thereof. The position sensor 390 may be located external to the IMU, internal to the IMU, or some combination thereof.

In some embodiments, the headset 300 may provide for simultaneous localization and mapping (SLAM) for a position of the headset 300 and updating of a model of the local area. For example, the headset 300 may include a passive camera assembly (PCA) that generates color image data. The PCA may include one or more RGB cameras that capture images of some or all of the local area. In some embodiments, some or all of the imaging devices 330 of the DCA may also function as the PCA. The images captured by the PCA and the depth information determined by the DCA may be used to determine parameters of the local area, generate a model of the local area, update a model of the local area, or some combination thereof. Furthermore, the position sensor 390 tracks the position (e.g., location and pose) of the headset 100 within the room.

Figure 4:
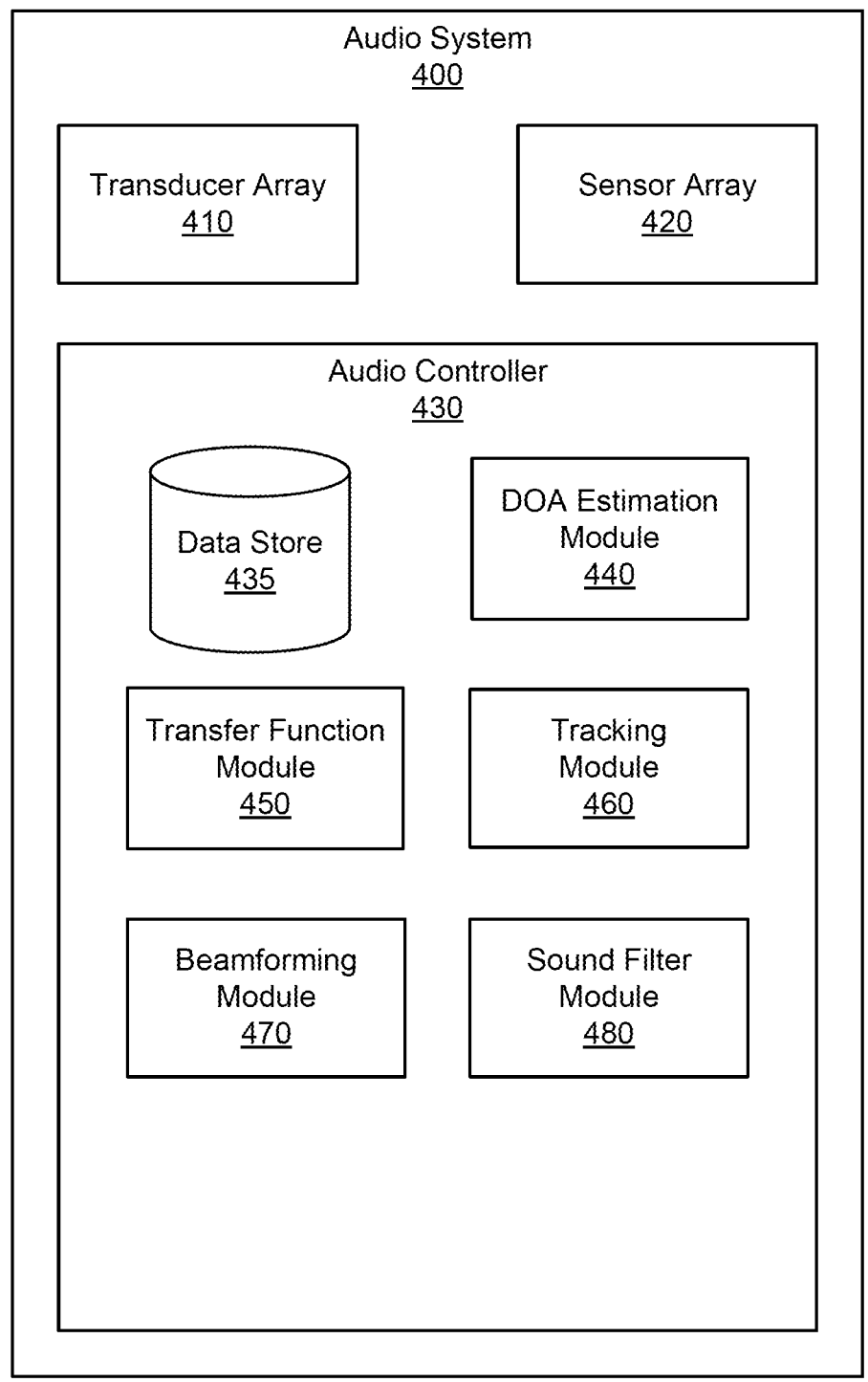
FIG. 4 is a block diagram of an audio system according to an implementation of the present disclosure.

Referring now to FIG. 4, an audio system 400 generates one or more acoustic transfer functions for a user. The audio system 400 may then use the one or more acoustic transfer functions to generate audio content for the user. The audio system 400 can include a transducer array 410, a sensor array 420, and an audio controller 430.

The transducer array 410 can configured to present audio content. The transducer array 410 includes a plurality of transducers, such as a speaker (e.g., the speaker 360), a tissue transducer (e.g., the tissue transducer 370), some other device that provides audio content, or some combination thereof. A tissue transducer may function as a bone conduction transducer or a cartilage conduction transducer. The transducer array 410 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 410 may include one or more transducers to cover different parts of a frequency range. For example, a piezoelectric transducer may be used to cover a first part of a frequency range and a moving coil transducer may be used to cover a second part of a frequency range.

The bone conduction transducers can generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 430, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 410 can generate audio content in accordance with instructions from the audio controller 430. In some embodiments, the audio content is spatialized. Spatialized audio content can appear to originate from a particular direction and/or target region (e.g., an object in the local area and/or a virtual object). For example, spatialized audio content can make it appear that sound is originating from a virtual singer across a room from a user of the audio system 400. The transducer array 410 may be coupled to a wearable device. The transducer array 410 may be a plurality of speakers that are separate from the wearable device (e.g., coupled to an external console).

The sensor array 420 can detect sounds within a local area surrounding the sensor array 420. The sensor array 420 may include a plurality of acoustic sensors that each detect air pressure variations of a sound wave and convert the detected sounds into an electronic format (analog or digital). The plurality of acoustic sensors may be positioned on a headset (e.g., headset 300), on a user (e.g., in an ear canal of the user), on a neckband, or some combination thereof. An acoustic sensor may be, e.g., a microphone, a vibration sensor, an accelerometer, or any combination thereof. In some embodiments, the sensor array 420 is configured to monitor the audio content generated by the transducer array 410 using at least some of the plurality of acoustic sensors.

Increasing the number of sensors may improve the accuracy of information (e.g., directionality) describing a sound field produced by the transducer array 410 and/or sound from the local area.

The audio controller 430 controls operation of the audio system 400. The audio controller 430 can include a data store 435, a DOA estimator 440, a transfer function 450, a tracker 460, a beamformer 470, and a sound filter 480. The audio controller 430 may be located inside a headset, in some embodiments. Some embodiments of the audio controller 430 have different components than those described here. Similarly, functions can be distributed among the components in different manners than described here. For example, some functions of the controller may be performed external to the headset.

The data store 435 can store data for use by the audio system 400. Data in the data store 435 may include sounds recorded in the local area of the audio system 400, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 400, or any combination thereof.

The DOA estimator 440 can localize sound sources in the local area based in part on information from the sensor array 420. Localization is a process of determining where sound sources are located relative to the user of the audio system 400. The DOA estimator 440 performs a DOA analysis to localize one or more sound sources within the local area. The DOA analysis may include analyzing the intensity, spectra, and/or arrival time of each sound at the sensor array 420 to determine the direction from which the sounds originated. In some cases, the DOA analysis may include any suitable algorithm for analyzing a surrounding acoustic environment in which the audio system 400 is located.

For example, the DOA analysis may be designed to receive input signals from the sensor array 420 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. The DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 420 received the direct-path audio signal. The determined angle may then be used to identify the DOA for the received input signal. Other algorithms not listed above may also be used alone or in combination with the above algorithms to determine DOA.

The DOA estimator 440 may determine the DOA with respect to an absolute position of the audio system 400 within the local area. The position of the sensor array 420 may be received from an external system (e.g., some other component of a headset, an artificial reality console, a mapping server, a position sensor (e.g., the position sensor 190, etc.). The external system may create a virtual model of the local area, in which the local area and the position of the audio system 400 are mapped. The received position information may include a location and/or an orientation of some or all of the audio system 400 (e.g., of the sensor array 420). The DOA estimator 440 may update the estimated DOA based on the received position information.

The transfer function 450 can generate one or more acoustic transfer functions. Generally, a transfer function is a mathematical function giving a corresponding output value for each possible input value. Based on parameters of the detected sounds, the transfer function 450 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF can include a number of transfer functions that characterize a relationship between the sound source and the corresponding sound received by the acoustic sensors in the sensor array 420. Accordingly, for a sound source there is a corresponding transfer function for each of the acoustic sensors in the sensor array 420. The sound source may be, e.g., someone or something generating sound in the local area, the user, or one or more transducers of the transducer array 410. The ATF for a particular sound source location relative to the sensor array 420 may differ from user to user due to a person's anatomy (e.g., ear shape, shoulders, etc.) that affects the sound as it travels to the person's ears. Accordingly, the ATFs of the sensor array 420 can be personalized for each user of the audio system 400.

The transfer function 450 can determine one or more HRTFs for a user of the audio system 400. The HRTF can characterize how an ear receives a sound from a point in space. The HRTF for a particular source location relative to a person can be unique to each ear of the person (and is unique to the person) due to the person's anatomy (e.g., ear shape, shoulders, etc.) that affects the sound as it travels to the person's ears. In some embodiments, the transfer function 450 may determine HRTFs for the user using a calibration process. In some embodiments, the transfer function 450 may provide information about the user to a remote system. The remote system determines a set of HRTFs that are customized to the user using, e.g., machine learning, and provides the customized set of HRTFs to the audio system 400.

The tracker 460 can track locations of one or more sound sources. The tracker 460 may compare current DOA estimates and compare them with a stored history of previous DOA estimates. In some embodiments, the audio system 400 may recalculate DOA estimates on a periodic schedule, such as once per second, or once per millisecond. The tracking module may compare the current DOA estimates with previous DOA estimates, and in response to a change in a DOA estimate for a sound source, the tracker 460 may determine that the sound source moved. In some embodiments, the tracker 460 may detect a change in location based on visual information received from the headset or some other external source. The tracker 460 may track the movement of one or more sound sources over time. The tracker 460 may store values for a number of sound sources and a location of each sound source at each point in time. In response to a change in a value of the number or locations of the sound sources, the tracker 460 may determine that a sound source moved. The tracker 460 may calculate an estimate of the localization variance. The localization variance may be used as a confidence level for each determination of a change in movement.

The beamformer 470 can process one or more ATFs to selectively emphasize sounds from sound sources within a certain area while de-emphasizing sounds from other areas. In analyzing sounds detected by the sensor array 420, the beamformer 470 may combine information from different acoustic sensors to emphasize sound associated from a particular region of the local area while deemphasizing sound that is from outside of the region. The beamformer 470 may isolate an audio signal associated with sound from a particular sound source from other sound sources in the local area based on, e.g., different DOA estimates from the DOA estimator 440 and the tracker 460. The beamformer 470 may thus selectively analyze discrete sound sources in the local area. In some embodiments, the beamformer 470 may enhance a signal from a sound source. For example, the beamformer 470 may apply sound filters which eliminate signals above, below, or between certain frequencies. Signal enhancement acts to enhance sounds associated with a given identified sound source relative to other sounds detected by the sensor array 420.

The sound filter 480 can determine sound filters for the transducer array 410. In some embodiments, the sound filters cause the audio content to be spatialized, such that the audio content appears to originate from a target region. The sound filter 480 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter 480 calculates one or more of the acoustic parameters. In some embodiments, the sound filter 480 requests the acoustic parameters from a mapping server (e.g., as described below with regard to FIG. 6).

The sound filter 480 can provide the sound filters to the transducer array 410. In some embodiments, the sound filters may cause positive or negative amplification of sounds as a function of frequency.

Figure 5:
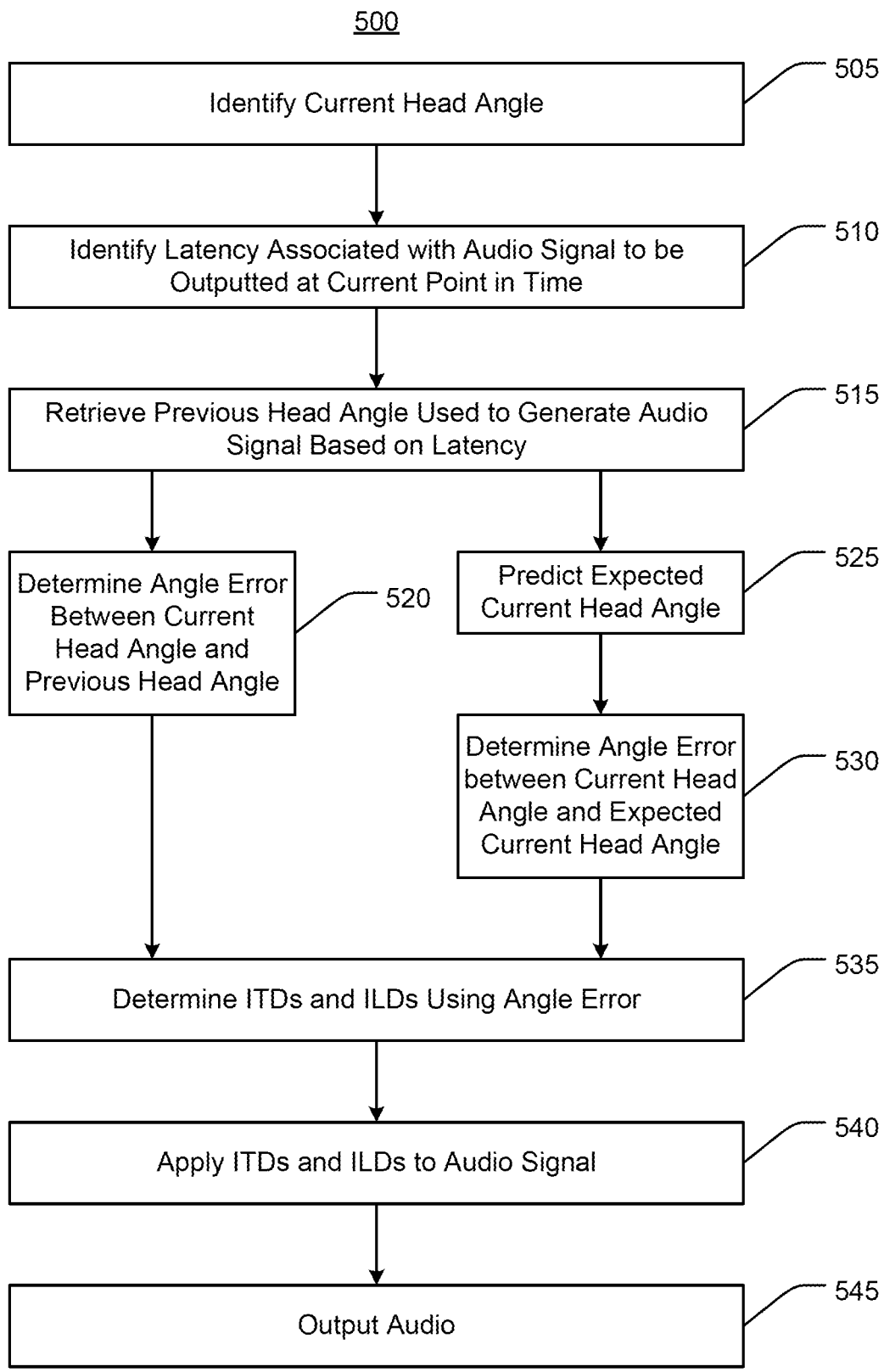
FIG. 5 is a flow diagram of a method for spatial update latency compensation for head-tracked audio according to an implementation of the present disclosure.

Referring now to FIG. 5, a method 500 for spatial update latency compensation for head-tracked audio is illustrated. In some embodiments, the method 500 can include one or more of the following operations which may or may not be performed in sequence. The method 500 can include identifying a current head angle of a device, such as an HWD, that outputs sound for perception by a user (505). The method 500 can include identifying a latency associated with an audio signal to be outputted at a current point in time (510). The method 510 can include retrieving a previous head angle used to generate the audio signal based at least on the latency (515). The method 500 can include determining an angle error between the current head angle and the previous head angle (520). The method 500 can include predicting an expected value of the current head angle (525). The method can include determining the angle error between the current head angle and the expected value of the current head angle (530). The method can include determining ITDs and ILDs using the angle error (535). The method 500 can include applying the ITDs and ILDs to the audio signal to adjust the audio signal (540). The method can include outputting the adjusted audio signal (545). The method 500 can be executed using various devices and systems described herein, including but not limited to the system 100, the HMD 200, the headset 300, the audio system 400, and the computing environment described with reference to FIG. 6.

In more detail, at 505, a head angle is identified. The head angle can be an angle of a head of a user, which may correspond to an angle of an HWD worn by the user. The head angle can be identified by for a current point in time (e.g., a point in time at which a most current audio signal is to be outputted). The head angle can be identified by receiving the head angle from a head tracker, such as a position sensor that may be coupled to the HWD or the head of the user, or that may be remote from the HWD or head of the user and monitors the head angle remotely (e.g., a camera-based head tracker). For example, the head tracker may periodically provide the head angle, or the head angle can be received by requesting the head angle. The head angle can be requested on a periodic basis or responsive to a request condition, such as initialization of an application used to generate audio content.

At 510, a latency associated with an audio signal to be outputted at the current point in time is identified. The latency may correspond to processing and/or network transmission times (e.g., round trip time) associated with providing a head angle to an audio engine that generates the audio signal, the audio engine generating the audio signal, and receipt of the audio signal from the audio engine. For example, the latency may include network transmission times for communicating the head angles and audio signals via a Bluetooth connection between the HWD and a device remote from the HWD that implements the audio engine. The latency may be a predetermined value, which can be retrieved in order to identify the latency. The latency may be measured, such as by assigning a time stamp or other identifier to a head angle, and causing the audio engine to include the identifier with the audio signal when the audio engine outputs the audio signal so that the time stamp of the head angle can be compared to a time stamp at which the audio signal is received in order to measure the latency. The latency may be measured and updated periodically or responsive to a trigger condition. For example, the latency may be measured on a periodic basis (e.g., every ten seconds; every minute; every hour) and a value of the latency maintained in memory may be updated responsive to measuring the latency. The latency may be measured responsive to trigger conditions such as initialization of the HWD or an application operated by the HWD, or detection of user behavior indicative of a request to calibrate the audio output, such as irregular or unexpected movements.

At 515, a previous head angle that was used to generate the audio signal that is now to be outputted at the current point in time retrieved based at least on the latency. For example, a buffer of head angles may be maintained, for a duration of head angles at least as long as the measured latency, that maps head angles to time stamps. The previous head angle can be retrieved by comparing the latency to the current point in time, in order to identify a previous point in time at which the previous head angle was measured, and retrieve the previous head angle using a time stamp corresponding to the previous point in time. For example, if the latency is measured to be 50 ms, the previous head angle can be identified as the head angle assigned a time stamp of negative 50 ms in the head angle buffer. The previous head angle can be a first head angle, while the current head angle is a second head angle.

At 520, an angle error is determined between the current head angle and the previous head angle. The angle error can be determined by comparing the current head angle to the previous head angle. For example, the angle error can be determined by subtracting the previous head angle from the current head angle.

At 525, an expected value of the current head angle can be predicted. For example, additionally or alternatively to determining the angle error using the current head angle and the previous head angle, the expected value of the current head angle can be predicted in order to determine the angle error. The expected value can be predicted using the previous head angle and the latency (e.g., a time difference between when the previous head angle was detected and a current time) to predict where the head would expected to be. The expected value can be predicted and provided to an audio engine used to generate the audio signal so that the audio engine generates the audio signal using the expected value. The expected value can be predicted using any of a variety of functions or models, such as a Kalman filter model, which can maintain a state of the head angle and update the state of the head angle using measured head angle data.

At 530, the angle error can be determined between the current head angle (e.g., as measured by sampling the head tracker) and the expected value of the current head angle (e.g., as provided by a model for the head angle). The angle error can be determined by subtracting the expected value of the current head angle from the measured value of the current head angle. The angle error can be determined responsive to determining the expected value of the current head angle.

At 535, one or more angle errors may be used to determine how to adjust the audio signal to compensate for the angle error (and in turn the latency represented by the angle error). For example, an ITD (e.g., change to ITD), an ILD (e.g., change to ILD), or a combination thereof may be determined using the angle errors. The ITD and ILD may be determined using the angle error determined by comparing the current head angle to the previous head angle, the angle error determined by comparing the current head angle to the expected value of the current head angle, or a combination thereof (e.g., a weighted average of the angle errors). The ITD and ILD may be determined responsive to determining the angle error. The ITD and ILD may be determined responsive to the angle error being greater than a threshold angle error. The ITD and ILD may be determined using various functions, models, lookup tables, or other operations that map the angle error to ITD, ILD, or a combination thereof. For example, the ITD and ILD may be determined using a system of equations that receive the angle error as input and output ITD and ILD (e.g., adjustments thereto) as output. In some implementations, the audio signal may include a multiplexed binaural audio signal that includes multiple audio streams or channels, and one or more of an ITD adjustment or an ILD adjustment can be determined for each audio stream or channel.

At 540, the adjustments to the audio signal, such as one or more ITD adjustments, ILD adjustments, or a combination thereof, can be applied to the audio signal or to each audio stream of the audio signal. For example, the ITD adjustment can be applied to the audio signal to delay one or more left channels or streams relative to one or more right channels or streams. The ITD adjustment can be applied by retrieving a predetermined duration of audio data corresponding to the ITD adjustment from a playback buffer (e.g., a playback buffer of 700 ms of audio data) and using the predetermined duration to delay the left channel(s) or right channel(s) (e.g., depending on the sign of the angle error). The ILD adjustment can be applied to the audio signal to increase or decrease a level or intensity of one or more left channels or streams relative to one or more right channels or streams. For example, the ILD adjustment can be determined by applying one or more of a scalar value, a biquad filter, or a zero pole filter to one or more channels or streams of the audio signal. The ITD and ILD adjustments can be applied to reduce the angle error. In some implementations, the ITD and ILD adjustments are selectively applied responsive to a frequency characteristic of the audio signal (or of a particular audio channel or audio stream).

At 545, the adjusted audio signal is outputted. The adjusted audio signal can be outputted using one or more audio output devices, such as speakers, bone conducting transducers, cartilage conducting transducers, haptic feedback devices, or any combination thereof. The adjusted audio signal can be outputted at a rate corresponding to a frame rate of images displayed (e.g., in VR or AR applications), or a rate of generation of the audio signal. The adjusted audio signal can be outputted at a rate less than the rate of generation of the audio signal, such as if the audio signal is downsampled prior to adjusting the audio signal, which may facilitate reducing processing demands associated with adjusting the audio signal while maintaining a target spatial image and compensating for latency effects. The adjusted audio signal can be outputted by controlling at least one of a timing (e.g., delay) and level of each channel (e.g., left and right channels) using the determined ITDs and ILDs.

The method 500 or steps or operations thereof can be performed based on various conditions. For example, operations can be performed responsive to initialization of the HWD, and audio system associated with the HWD, or an application executed to provide audio content. Operations can be performed on a periodic basis, such as to recalibrate measurement of latency in the system. Operations can be performed at, above, or below an audio bitrate or audio sample rate associated with generation of or outputting of audio signals, or a video frame rate associated with generation and output of video frames. For example, if audio signals are generated every one ms, head angle detection and compensation (e.g., by adjusting the audio signal) can be performed every one ms, while latency measurement can be performed every ten seconds.

Figure 6:
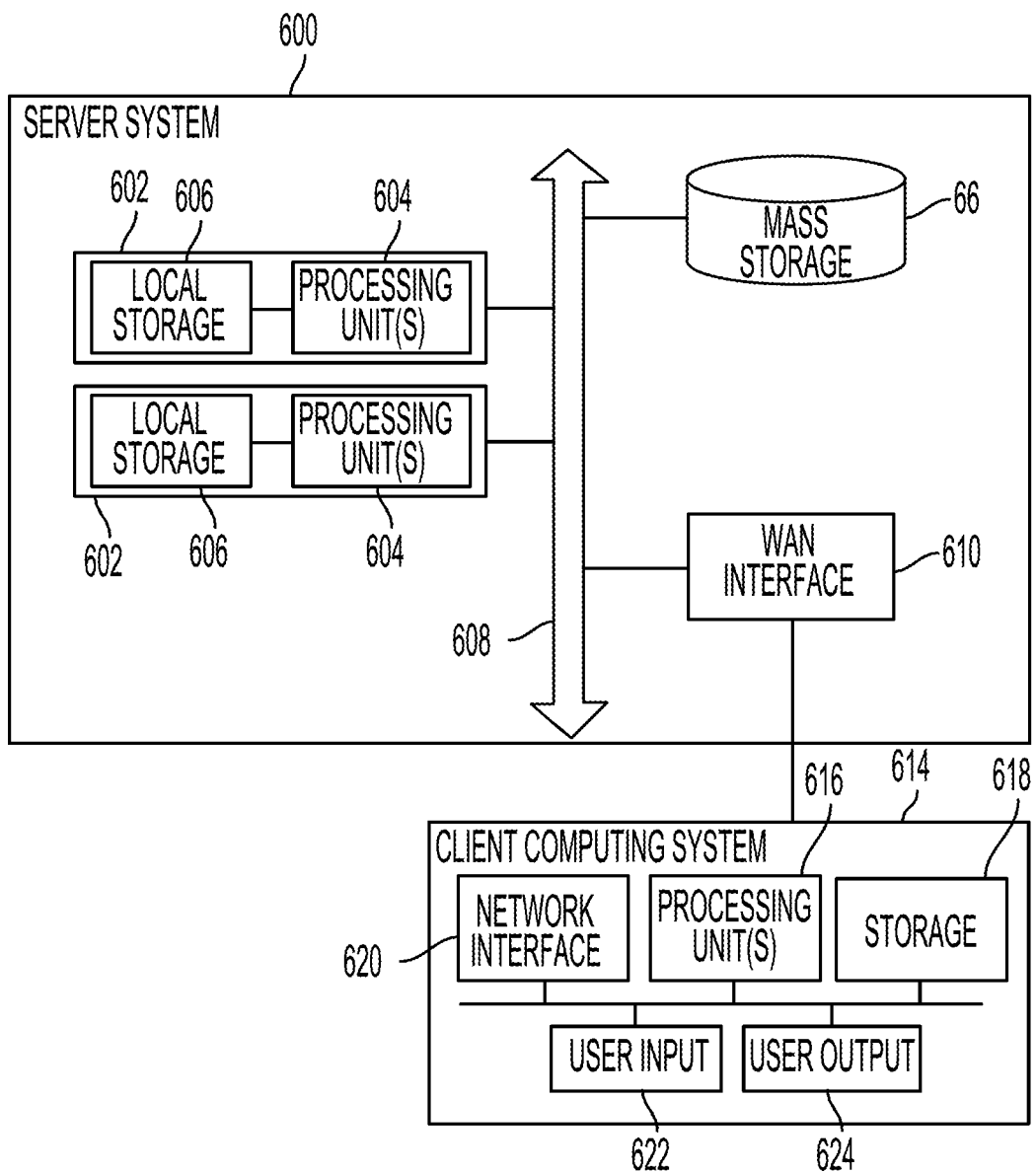
FIG. 6 is a block diagram of a computing environment according to an implementation of the present disclosure.

Various operations described herein can be implemented on computer systems. FIG. 6 shows a block diagram of a representative server system 600 and client computer system 614 usable to implement the present disclosure. Server system 600 or similar systems can implement services or servers described herein or portions thereof. Client computer system 614 or similar systems can implement clients described herein. Each of the systems 100, 200 and others described herein can incorporate features of the systems 600, 614.

Server system 600 can have a modular design that incorporates a number of modules 602 (e.g., blades in a blade server); while two modules 602 are shown, any number can be provided. Each module 602 can include processing unit(s) 604 and local storage 606.

Processing unit(s) 604 can include a single processor, which can have one or more cores, or multiple processors. Processing unit(s) 604 can include a general-purpose primary processor as well as one or more special-purpose co-processors such as graphics processors, digital signal processors, or the like. Some or all processing units 604 can be implemented using customized circuits, such as application specific integrated circuits (ASICs) or field programmable gate arrays (FPGAs). Such integrated circuits execute instructions that are stored on the circuit itself. Processing unit(s) 604 can execute instructions stored in local storage 606. Any type of processors in any combination can be included in processing unit(s) 604.

Local storage 606 can include volatile storage media (e.g., conventional DRAM, SRAM, SDRAM, or the like) and/or non-volatile storage media (e.g., magnetic or optical disk, flash memory, or the like). Storage media incorporated in local storage 606 can be fixed, removable or upgradeable as desired. Local storage 606 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 604 need at runtime. The ROM can store static data and instructions that are needed by processing unit(s) 604. The permanent storage device can be a non-volatile read-and-write memory device that can store instructions and data even when module 602 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Local storage 606 can store one or more software programs to be executed by processing unit(s) 604, such as an operating system and/or programs implementing various server functions such as functions of the system 100, or any other system described herein, or any other server(s) associated with the system 100 or any other system described herein.

"Software" refers generally to sequences of instructions that, when executed by processing unit(s) 604 cause server system 600 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 604. Software can be implemented as a single program or a collection of separate programs or program modules that interact as desired. From local storage 606 (or non-local storage described below), processing unit(s) 604 can retrieve program instructions to execute and data to process in order to execute various operations described above.

In some server systems 600, multiple modules 602 can be interconnected via a bus or other interconnect 608, forming a local area network that supports communication between modules 602 and other components of server system 600. Interconnect 608 can be implemented using various technologies including server racks, hubs, routers, etc.

A wide area network (WAN) interface 610 can provide data communication capability between the local area network (interconnect 608) and a larger network, such as the Internet. Conventional or other activities technologies can be used, including wired (e.g., Ethernet, IEEE 302.3 standards) and/or wireless technologies (e.g., Wi-Fi, IEEE 302.11 standards).

Local storage 606 can provide working memory for processing unit(s) 604, providing fast access to programs and/or data to be processed while reducing traffic on interconnect 608. Storage for larger quantities of data can be provided on the local area network by one or more mass storage subsystems 612 that can be connected to interconnect 608. Mass storage subsystem 612 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 612. Additional data storage resources may be accessible via WAN interface 610 (potentially with increased latency).

Server system 600 can operate in response to requests received via WAN interface 610. For example, one of modules 602 can implement a supervisory function and assign discrete tasks to other modules 602 in response to received requests. Conventional work allocation techniques can be used. As requests are processed, results can be returned to the requester via WAN interface 610. Such operation can generally be automated. WAN interface 610 can connect multiple server systems 600 to each other, providing scalable systems capable of managing high volumes of activity. Conventional or other techniques for managing server systems and server farms (collections of server systems that cooperate) can be used, including dynamic resource allocation and reallocation.

Server system 600 can interact with various user-owned or user-operated devices via a wide-area network such as the Internet. An example of a user-operated device is shown in FIG. 4 as client computing system 614. Client computing system 614 can be implemented, for example, as a consumer device such as a smartphone, other mobile phone, tablet computer, wearable computing device (e.g., smart watch, eyeglasses), desktop computer, laptop computer, and so on.

For example, client computing system 614 can communicate via WAN interface 610. Client computing system 614 can include conventional computer components such as processing unit(s) 616, storage device 618, network interface 620, user input device 622, and user output device 624. Client computing system 614 can be a computing device implemented in a variety of form factors, such as a desktop computer, laptop computer, tablet computer, smartphone, other mobile computing device, wearable computing device, or the like.

Processor 616 and storage device 618 can be similar to processing unit(s) 604 and local storage 606 described above. Suitable devices can be selected based on the demands to be placed on client computing system 614; for example, client computing system 614 can be implemented as a "thin" client with limited processing capability or as a high-powered computing device. Client computing system 614 can be provisioned with program code executable by processing unit(s) 616 to enable various interactions with server system 600 of a message management service such as accessing messages, performing actions on messages, and other interactions described above. Some client computing systems 614 can also interact with a messaging service independently of the message management service.

Network interface 620 can provide a connection to a wide area network (e.g., the Internet) to which WAN interface 610 of server system 600 is also connected. Network interface 620 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 622 can include any device (or devices) via which a user can provide signals to client computing system 614; client computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, and so on.

User output device 624 can include any device via which client computing system 614 can provide information to a user. For example, user output device 624 can include a display to display images generated by or delivered to client computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 604 and 616 can provide various functionality for server system 600 and client computing system 614, including any of the functionality described herein as being performed by a server or client, or other functionality associated with message management services.

It will be appreciated that server system 600 and client computing system 614 are illustrative and that variations and modifications are possible. Computer systems used in connection with the present disclosure can have other capabilities not specifically described here. Further, while server system 600 and client computing system 614 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
    identifying, by one or more processors, a first head angle of a head worn display (HWD) at a time of generating an audio signal and a second head angle of the HWD at a time at which the audio signal is to be outputted;
    applying, by the one or more processors, at least one of a time difference or a level difference to the audio signal based at least on the first head angle and the second head angle; and
    outputting, by the one or more processors, the audio signal.

2. The method of claim 1, wherein adjusting the audio signal comprises:
    determining, by the one or more processors, an angle error based at least on the first head angle and the second head angle; and
    adjusting, by the one or more processors, the at least one of the time difference or the level difference based at least on the angle error.

3. The method of claim 1, wherein the audio signal is a binaural signal.

4. The method of claim 1, wherein identifying the first head angle and the second head angle comprises receiving the first head angle and the second head angle from a position sensor associated with the HWD.

5. The method of claim 1, wherein:
    applying the time difference includes modifying, by the one or more processors, an interaural time difference (ITD) of the audio signal; and applying the level difference includes modifying, by the one or more processors, an interaural level difference (ILD) of the audio signal.

6. The method of claim 1, further comprising identifying the first head angle based at least on a latency associated with generating the audio signal.

7. The method of claim 1, wherein identifying the first head angle comprises predicting, by the one or more processors, a state of the HWD at a time at which the adjusted audio signal is to be outputted.

8. A device, comprising:
one or more processors configured to:
identify, using data from a sensor, a first angle associated with an audio output device at a time of generating an audio signal and a second angle associated with the audio output device at a time at which the audio signal is to be outputted; and
adjust the audio signal based at least on the first angle and the second angle.

9. The device of claim 8, wherein the one or more processors are configured to adjust the audio signal by modifying at least one of an interaural time difference (ITD) of the audio signal or an interaural level difference (ILD) of the audio signal.

10. The device of claim 8, wherein the one or more processors are configured to adjust the audio signal by determining an angle error based at least on the first angle and the second angle.

11. The device of claim 8, wherein the audio signal is a binaural signal.

12. The device of claim 8, wherein the one or more processors are configured to assign a tag comprising at least one of the time of generating the audio signal or the first angle to the audio signal.

13. The device of claim 8, wherein the one or more processors are configured to identify the first angle based at least on a latency associated with generating the audio signal.

14. The device of claim 8, wherein the one or more processors are configured to identify the first angle by predicting an angular position of a display at a time at which the adjusted audio signal is to be outputted.

15. A non-transitory processor-readable medium comprising processor-executable instructions that when executed by one or more processors, cause the one or more processors to:
detect a first head angle of a display mounted on a head of a user at a time of generating an audio signal and a second head angle of the display at a time at which the audio signal is to be outputted;
apply at least one of a time difference or a level difference to the audio signal based at least on the first head angle and the second head angle; and
output the audio signal.

16. The non-transitory processor-readable medium of claim 15, further comprising instructions that cause the one or more processors to modify at least one of an interaural time difference (ITD) of the audio signal or an interaural level difference (ILD) of the audio signal.

17. The non-transitory processor-readable medium of claim 15, wherein the audio signal is a binaural signal.

18. The non-transitory processor-readable medium of claim 15, further comprising instructions that cause the one or more processors to identify the first head angle based at least on a latency associated with generating the audio signal.

19. The non-transitory processor-readable medium of claim 15, further comprising instructions that cause the one or more processors to identify the first head angle by predicting a state of the display at a time at which the adjusted audio signal is to be outputted.

20. The non-transitory processor-readable medium of claim 15, further comprising instructions that cause the one or more processors to assign a tag comprising at least one of the time of generating the audio signal or the first head angle to the audio signal.

\* \* \* \* \*